United States Patent [19]
Irie

[11] Patent Number: 6,158,998
[45] Date of Patent: *Dec. 12, 2000

[54] TIRE VULCANIZER

[75] Inventor: Nobuhiko Irie, Nagasaki, Japan

[73] Assignee: Mitsubishi Heavy Industries, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/837,863

[22] Filed: Apr. 29, 1997

[30] Foreign Application Priority Data

Jul. 29, 1996 [JP] Japan .................................. 8-199158

[51] Int. Cl.[7] .................................................. B29C 35/02
[52] U.S. Cl. ............................................ 425/34.1; 425/38
[58] Field of Search .................................. 425/28.1, 34.1, 425/38, 47

[56] References Cited

U.S. PATENT DOCUMENTS

| | | | |
|---|---|---|---|
| 3,550,196 | 12/1970 | Gazuit . | |
| 3,697,206 | 10/1972 | Bonazzi | ..................................... 425/20 |
| 3,918,861 | 11/1975 | Klose | ..................................... 425/34.1 |
| 3,932,079 | 1/1976 | Legostaev et al. | ..................... 425/34.1 |
| 3,988,077 | 10/1976 | Naratov et al. | ......................... 425/34.1 |
| 4,025,251 | 5/1977 | Cantarutti | ................................... 425/31 |
| 4,585,405 | 4/1986 | Capecchi | .................................. 425/34.1 |
| 5,165,939 | 11/1992 | Pizzorno | ................................. 425/34.1 |
| 5,271,727 | 12/1993 | Irie | ........................................ 425/34.1 |
| 5,589,200 | 12/1996 | Irie | ............................................. 425/46 |
| 5,681,594 | 10/1997 | Irie | ........................................ 425/34.1 |
| 5,741,528 | 4/1998 | Amano et al. | ........................... 425/34.1 |

FOREIGN PATENT DOCUMENTS

| | | | |
|---|---|---|---|
| 2833235 | 2/1979 | Germany | ............................. 425/34.1 |
| 05200754 | 8/1993 | Japan . | |
| 07001469 | 1/1995 | Japan . | |
| 08047928 | 2/1996 | Japan . | |

*Primary Examiner*—James P. Mackey
*Attorney, Agent, or Firm*—Anderson, Kill & Olick P.C.

[57] ABSTRACT

A tire vulcanizer in accordance with the present invention comprises a fixed base on which tire vulcanization molds are mounted, a movable frame which can reciprocate in the longitudinal direction on the fixed base, and an elevating frame attached to the movable frame so as to be raised and lowered. After the tire vulcanization mold is opened by raising the elevating frame and lifting an upper half mold of the tire vulcanization mold, the upper half mold of the tire vulcanization mold is moved to the rear by the movable frame to carry out the removal of a vulcanized tire and the supply of a green tire.

3 Claims, 4 Drawing Sheets

TIRE VULCANIZER

FIELD OF THE INVENTION AND RELATED ART STATEMENT

The present invention relates to a vulcanizer for a tire mounted on an automobile etc.

In a conventional tire vulcanizing press, during the vulcanization of a tire, forces to open a tire vulcanization mold, which are produced by a pressure of a heating/pressurizing medium of a high temperature and high pressure introduced in the tire, are offset in the mold, so that the tire vulcanization mold is tightened during the vulcanization to prevent the mold from being opened. Accordingly, the applicant has already proposed a tire vulcanizing press in which a need for tightening the tire vulcanization mold is eliminated in such a case (see Japanese Patent Provisional Publication No. 5-200754 (No. 200754/1993)).

Also, in a conventional tire vulcanizing press, the time for the loading and shaping of a green tire and removal of a vulcanized tire is far shorter than the vulcanizing reaction time (the time for vulcanizing reaction carried out by introducing a heating/pressurizing medium into a tire with the tire vulcanization mold closed), so that the rate of operation of the mold opening/closing device and tire loading device is low. Accordingly, the applicant has already proposed a tire vulcanizing press for solving this problem (see Japanese Patent Provisional Publication No. 7-1469 (No. 1469/1995)).

However, the aforesaid tire vulcanizing press developed to meet the need for improved tire uniformity requires the installation space for a green tire loader etc. between the opened tire vulcanization molds, so that the elevation stroke for an upper half mold of tire vulcanization mold is large, by which the tire vulcanizing press is made high. Therefore, when the aforesaid tire vulcanizing press is transported to an end user, the press must be carried with the high portion disassembled, which results in an increase in transportation-related cost.

OBJECT AND SUMMARY OF THE INVENTION

The present invention was made to solve the above problems. Accordingly, an object of the present invention is to provide a tire vulcanizer which (1) can significantly reduce the transportation-related cost and (2) can decrease the ceiling height of a factory in which the tire vulcanizer is installed.

To achieve the above object, the tire vulcanizer in accordance with the present invention comprises a fixed base 1 on which tire vulcanization molds M are mounted, a movable frame 4 which can reciprocate in the longitudinal direction on the fixed base 1, and an elevating frame 6 attached to the movable frame 4 so as to be raised and lowered, and is characterized in that after the tire vulcanization mold M is opened by raising the elevating frame 6 and lifting an upper half mold Ma of the tire vulcanization mold M, the upper half mold Ma of the tire vulcanization mold M is moved to the rear by the movable frame 4 to carry out the removal of a vulcanized tire and the supply of a green tire (claim 1).

In the tire vulcanizer defined in accordance with the present invention, a plurality of sets of tire vulcanization molds M may be mounted on the fixed frame 1, and a connection severing device 8b for severing the connection between the upper half mold Ma and lower half mold Mb of the tire vulcanization mold M in which vulcanization process is finished is attached to the elevating frame 6 so as to correspond to each tire vulcanization mold M.

In the tire vulcanizer in accordance with the present invention, a horizontal rail 6d may be attached to the elevating frame 6 in the transverse direction, and the connection severing device 8b may be supported by the horizontal rail 6d so as to be movable in the transverse direction.

In the tire vulcanizer in accordance with the present invention, a horizontal rail 9a may be attached to the elevating frame 6 in the transverse direction, and a green tire loader 11 may be supported by the rail 9a so as to be movable in the transverse direction.

The tire vulcanizer in accordance with the present invention is configured as described above, so that it achieves the following effects. The conventional tire vulcanizing press developed to meet the need for improved tire uniformity requires the installation space for a green tire loader etc. between the opened tire vulcanization molds, so that the elevation stroke for the upper half mold of tire vulcanization mold is large, by which the tire vulcanizing press is made high. Therefore, when the tire vulcanizing press is transported to an end user, the press must be carried with the high portion disassembled. However, in the tire vulcanizer of the present invention, configured as described above, the upper half mold of the tire vulcanization mold is retreated after being raised from the lower half mold, so that the elevation stroke of the upper half mold of the tire vulcanization mold can be made small. Therefore, according to the tire vulcanizer in accordance with the present invention, the height of the tire vulcanizer can be decreased, and the tire vulcanizer can be transported to an end user without being disassembled, so that the transportation-related cost can be decreased significantly.

Also, since the height of the tire vulcanizer can be decreased, the ceiling height of a factory in which the tire vulcanizer is installed can be decreased.

DETAILED DESCRIPTION OF PREFERRED EMBODIMENTS (First embodiment)

A tire vulcanizer in accordance with a first embodiment of the present invention will be described with reference to FIGS. 1 to 3.

Figure 1:
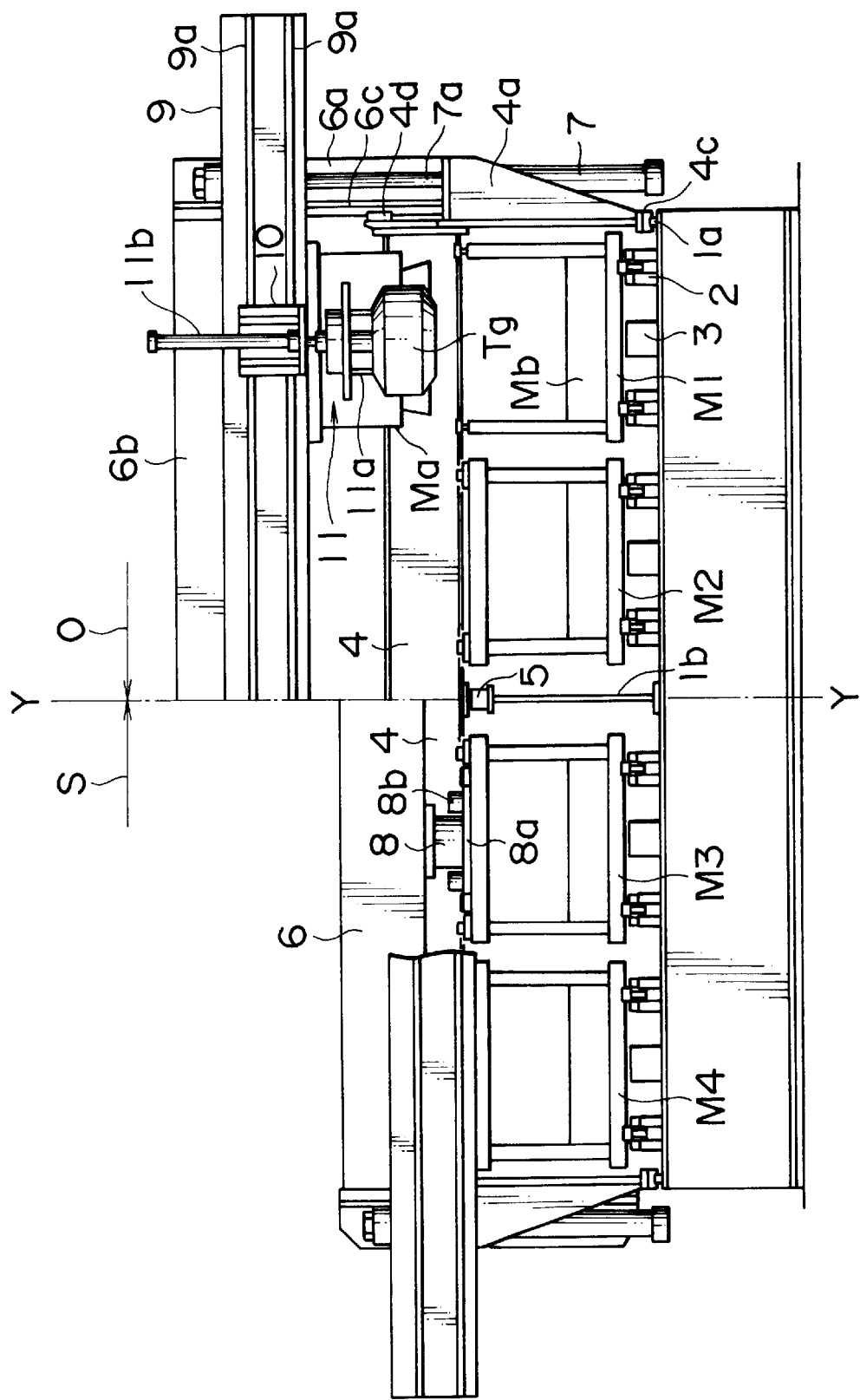
FIG. 1 is a front view of a tire vulcanizer in accordance with a first embodiment of the present invention, showing a state in which tire vulcanization molds (M3, M4 . . . ) are closed on the left side of line Y—Y, and a state in which a set of tire vulcanization mold M (M1) is open on the right side of line Y—Y.
Figure 2:
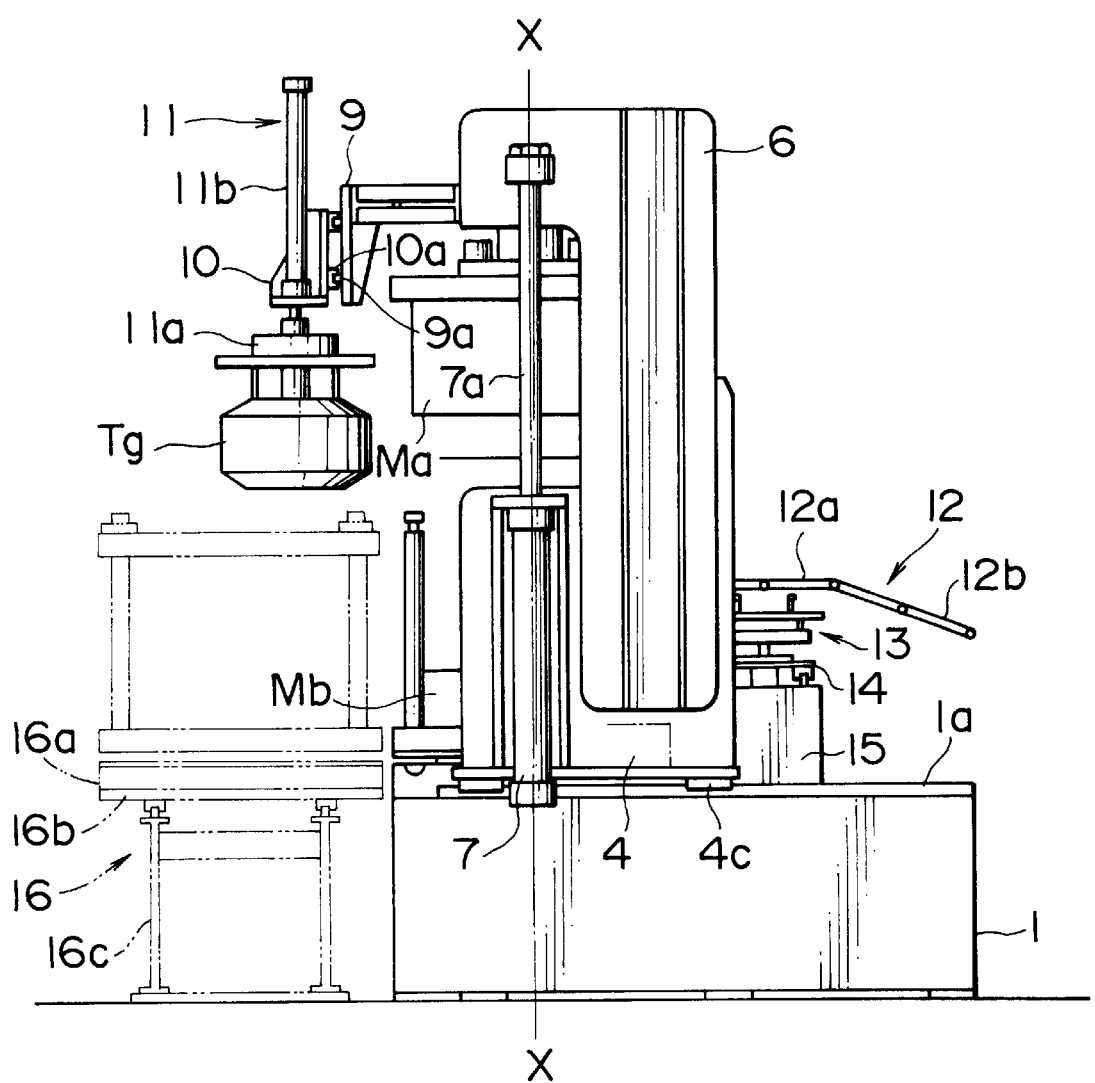
FIG. 2 is a side view of the tire vulcanizer viewed from the right of FIG. 1.
Figure 3:
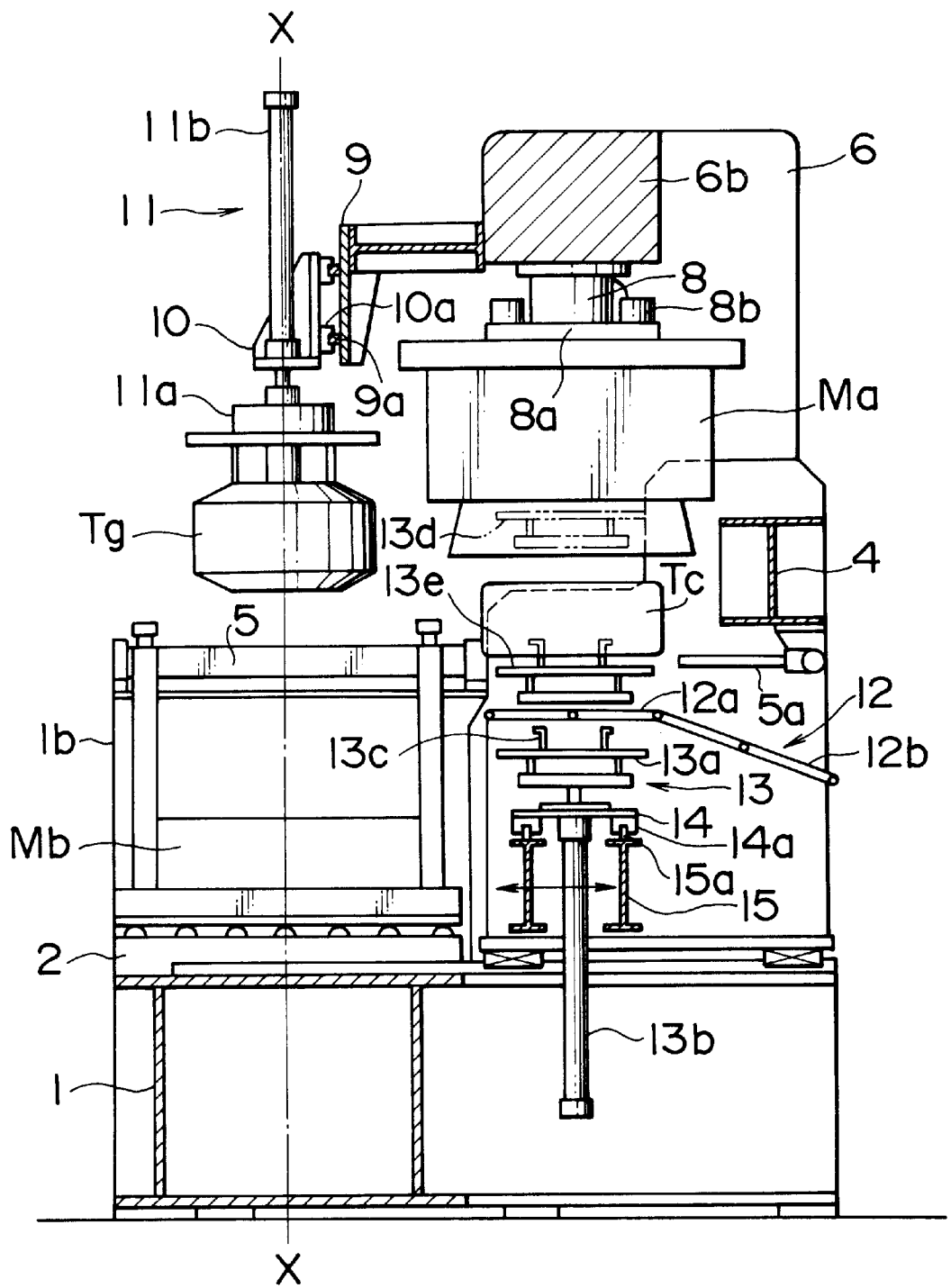
FIG. 3 is a longitudinal side sectional view of the tire vulcanizer, showing a state in which an upper half mold Ma of a open tire vulcanization mold M1 retreats, and the centerline X—X of a lower half mold Mb of the tire vulcanization mold M1 agrees with the center of a green tire loader 11.

FIG. 1 is a front view of a tire vulcanizer in accordance with a first embodiment of the present invention, showing a state 5 in which tire vulcanization molds (M3, M4 . . . ) are closed on the left side of line Y—Y, and a state 0 in which a set of tire vulcanization mold M (M1) is open on the right side of line Y—Y, FIG. 2 is a side view of the tire vulcanizer viewed from the right of FIG. 1, and FIG. 3 is a longitudinal side sectional view of the tire vulcanizer, showing a state in which an upper half mold Ma of a open tire vulcanization mold Ml retreats, and the centerline X—X of a lower half mold Mb of the tire vulcanization mold M1 agrees with the center of a green tire loader 11.

Reference numeral 1 denotes a fixed base for the tire vulcanizer. In the fixed base 1 are incorporated a publicly known center mechanism 3 and piping for a heating/pressurizing medium. To the top surface of the fixed base 1, mold loading/unloading roller guides 2 are assembled. In the case of this embodiment, four sets of tire vulcanization molds M (M1 to M4) are mounted on the mold loading/unloading roller guides 2, and a lower half mold Mb of the tire vulcanization mold M is fixed to the fixed base 1 by means of a locking device (not shown).

A type of tire vulcanization mold M, in which during the vulcanization of a tire, forces to open the tire vulcanization mold, which are produced by a pressure of the heating/pressurizing medium of a high temperature and high pressure introduced in the tire, are offset in the tire vulcanization mold M, (for example, the type disclosed in Japanese Patent Provisional Publication No. 8-47928 (No. 47928/1996)) is employed.

Reference numeral 1a denotes horizontal rails fixed on the top surface at both sides in the transverse direction of the fixed base 1 along the longitudinal direction, 4c denotes an direct-acting bearing engaging with respective horizontal rails 1, 4a denotes a leg erected on the direct-acting bearing 4c, and 4 denotes a movable frame fixed to the upper end of the leg 4a. The movable frame 4 can move longitudinally along the horizontal rail 1a.

Reference numeral 1b is a bracket erected at the center in the transverse direction of the fixed base 1, 5 denotes a cylinder attached to the upper end of the bracket 1b, and 5a denotes a piston rod in the cylinder 5. The tip end of the piston rod 5a is connected to the movable frame 4. By actuating the cylinder 5 in the extension/contraction direction, the movable frame 4 is moved in the longitudinal direction.

Reference numeral 6 denotes an elevating frame, 6a denotes right and left legs for the elevating frame 6, 6b denotes a beam for connecting the right and left legs 6a, 6c denotes vertical rails fixed to the right and left legs 6a, and 4d denotes a direct-acting bearing which engages with the vertical rail 6c and is fixed to the leg 4a of the movable frame 4. The elevating frame 6 can be raised and lowered along the vertical rails 6c.

Reference numeral 7 denotes a cylinder fixed to the movable frame 4, and 7a denotes a piston rod in the cylinder 7. The upper end of the piston rod 7a is connected to the elevating frame 6. By actuating the cylinder 7 in the extension/contraction direction, the elevating frame 6 is raised and lowered.

Reference numeral 8 denotes a spacer (a spacer incorporating an upper center mechanism, divided tread mold opening/closing cylinder, and other devices as necessary) fixed to the lower surface of the beam 6b of the elevating frame 6, 8a denotes a lower flange fixed to the lower part of the spacer 8, 8b denotes a connection severing device (a publicly known connection severing device for severing the connection between the upper mold Ma and lower mold Mb of the tire vulcanization mold M (see Japanese Patent Provisional Publication No. 7-1469 (No. 1469/1995)) attached to the top surface of the lower flange 8a.

Reference numeral 9 denotes a beam fixed to the front face of the beam 6b of the elevating frame, 9a denotes upper and lower horizontal rails fixed to the front face of the beam 9 along the transverse direction, 10a denotes a direct-acting bearing engaging with each horizontal rail 9a, 10 denotes a loader transfer member fixed to the direct-acting bearings 10a, 11 denotes a green tire loader, 11b denotes a cylinder erected on the loader transfer member 10, and 11a denotes a loader basket attached to the lower end of the piston rod of the cylinder 11b. By actuating a drive means (not shown), the loader transfer member 10 can be moved in the transverse direction. Also, when the movable frame 4 is moved in the longitudinal direction by actuating the cylinder 5 in the extension/contraction direction, the green tire loader 11 is moved in the longitudinal direction via the elevating frame 6.

Reference numeral 12 denotes a vulcanized tire Tc delivering roller conveyor of the same number as that of the tire vulcanization molds M. The vulcanized tire delivering roller conveyor 12 consists of a fixed portion 12b attached so as to be inclined with respect to the fixed base 1 and a swinging portion 12a attached to the upper end of the fixed portion 12b so as to be capable of swinging between the horizontal position and inclined position. The central portion of the swinging portion 12a has a roller arrangement such as to pass a tire holding means 13a, mentioned later, but not to pass the vulcanized tire Tc.

Reference numeral 13 denotes a vulcanized tire Tc removing device. The vulcanized tire Tc removing device 13, including a tire holding means 13a having a holding claw 13c and a cylinder 13b for raising and lowering the tire holding means 13a, is configured as if the green tire loader 11 is attached to a movable stand 14, mentioned later, reversely in the vertical direction.

Reference numeral 15 denotes a pair of beams fixed to the fixed base 1, 15a denotes horizontal rails fixed to respective beams 15 along the transverse direction, 14a denotes direct-acting bearings engaging with respective horizontal rails 15a, and 14 denotes a movable stand fixed to the direct-acting bearings 14a. The movable stand 14 is configured so as to be capable of moving in the transverse direction.

Reference numeral 16 denotes a tire vulcanization mold M transfer device. The tire vulcanization mold M transfer device 16, including a base 16c, a movable stand 16b mounted on the base 16c so as to be capable of moving in the transverse direction, a roller guide 16a attached to the top surface of the movable stand 16b along the longitudinal direction, and a drive means (not shown), is arranged on the front side of the fixed base 1. When the tire vulcanization mold M is loaded and unloaded by using a forklift etc., this tire vulcanization mold M transfer device 16 is unnecessary. Also, the mold loading/unloading roller guides 2 can be omitted.

Next, the operation of the tire vulcanizer shown in FIGS. 1 to 3 will be described in detail.

If the tire vulcanization in the tire vulcanization mold M1 is finished, and a green tire Tg to be vulcanized in the tire vulcanization mold M1 is held by the green tire loader 11 and waits, the heating/pressurizing medium in the tire is discharged, and the connection between the upper half mold Ma and lower half mold Mb of the tire vulcanization mold M1 is severed by actuating the connection severing device 8b corresponding to the tire vulcanization mold M1.

Then, the upper half mold Ma of the tire vulcanization mold M1 1 is opened by actuating the cylinder 7 and raising the elevating frame 6. When the upper mold Ma is raised to a height such as not to interfere with the lower half mold Mb, the raising of the elevating frame 6 is stopped (see FIG. 2). At this time, a vulcanized tire Tc is also raised together with the upper half mold Ma. Since this operation is publicly known, the detailed explanation thereof is omitted.

Subsequently, the movable frame 4 is retreated by actuating the cylinder 5. At this time, the green tire loader 11, which holds the upper half mold Ma and the green tire Tg via the elevating frame 6, retreats. When the center of the green tire loader 11 agrees with the centerline X—X of the lower half mold Mb, the retreat of the movable frame 4 is stopped (see FIG. 3). At this time, the vulcanized tire Tc removing device 13 is arranged so as to align with the center of the upper half mold Ma.

After the retreat of the movable frame 4 is stopped, the loader basket 11a is lowered to supply the green tire Tg into the empty lower half mold Mb. On the other hand, the empty loader basket 11a is raised.

During this time, the vulcanized tire Tc removing device 13 is raised while the tire holding means 13a closes the holding claw 13c. When the holding claw 13c reaches the inside of the lower bead of the vulcanized tire Tc (see the chain line 13d in FIG. 3), the raising of the tire holding means 13a is stopped. The holding claw 13c is opened to hold the vulcanized tire Tc.

Then, the holding means 13a is lowered to remove the vulcanized tire Tc from the upper half mold Ma by pulling it down out of the upper half mold Ma.

When the holding means 13a is lowered to a position indicated by the solid line 13e in FIG. 3, the holding claw 13c is closed and the holding means is further lowered. At this time, the vulcanized tire Tc is left on the swinging portion 12a of the vulcanized tire Tc delivering roller conveyor 12, and the holding means 13a passes through the swinging portion 12a, reaching the lowering limit position to stop.

Subsequently, the swinging portion 12a is inclined to deliver the vulcanized tire Tc to the outside of the tire vulcanizer by gravity via the fixed portion 12b.

After the loading and unloading operation of the tire is finished, the upper half mold Ma is advanced by reversing above procedure, and the upper half mold Ma is lowered while carrying out the shaping to close the tire vulcanization mold M1.

Then, the upper half mold Ma is connected to the lower half mold Mb, and a heating/pressuring medium for vulcanization is introduced into the tire to start the vulcanization process. At the same time, the connection between the upper half mold Ma and the elevating frame 6 is severed by using the connection severing device 8b, and the green tire loader 11 is moved to a green tire Tg supply position to receive the green tire Tg to be vulcanized next.

After that, the green tire loader 11 is moved to a position in front of the tire vulcanization mold M in which the vulcanization process is to be finished and kept waiting, and the vulcanized tire Tc removing device 13 is moved to a position at the rear of the tire vulcanization mold M in which the vulcanization process is to be finished next and kept waiting.

During the above time, the vulcanization process is continued in other tire vulcanization molds M.

In the case where the tire vulcanization mold M transfer device 16 is provided, when the change of mold, change of bladder, which is an expendable, and the cleaning of mold are performed, the lock of the lower half mold Mb to the fixed base 1 is released, and then the tire vulcanization mold M is pulled out onto the movable stand 16b and moved to the mold change work position, where the necessary work is done. After the work is finished, the tire vulcanization mold M is mounted by reversing above procedure. During this time, vulcanization is continued in other tire vulcanization molds M, and the tire can be loaded and unloaded by opening the tire vulcanization mold M during the time when the mounting and demounting operation of mold is not interfered with.

(Second embodiment)

Next, a tire vulcanizer in accordance with a second embodiment of the present invention will be described with reference to FIG. 4.

Figure 4:
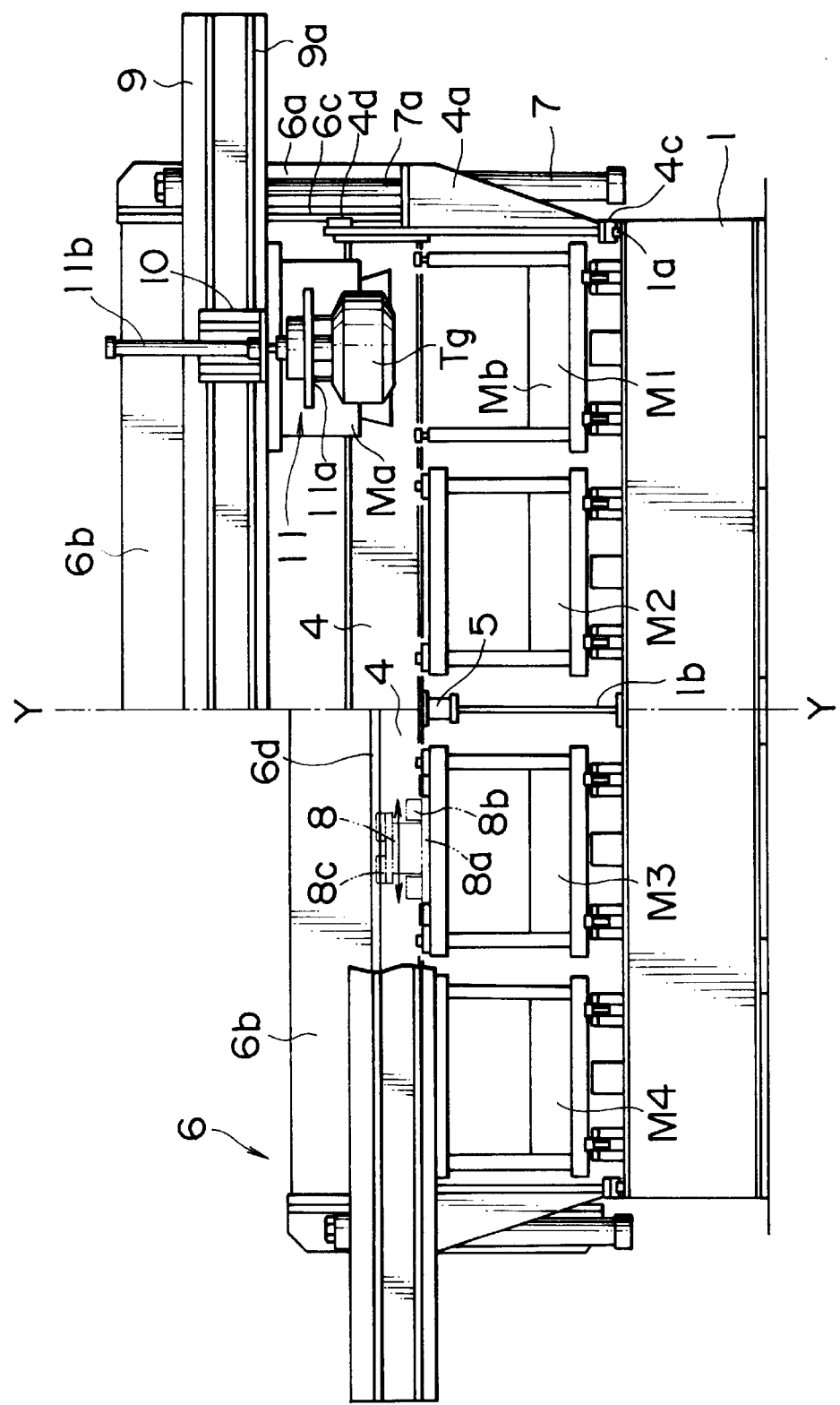
FIG. 4 is a front view of a tire vulcanizer in accordance with a second embodiment of the present invention.

FIG. 4 is a front view of the tire vulcanizer in accordance with the second embodiment. The configuration of the tire vulcanizer in accordance with the second embodiment is the same as that of the tire vulcanizer in accordance with the first embodiment except the connection severing device 8b (the connection severing device for severing the connection between the elevating frame 6 and upper mold Ma of the tire vulcanization mold M), so that only different points will be described.

Although in the first embodiment, the spacer 8 attached to the connection severing device 8b is fixed on the lower surface of the beam 6b of the elevating frame 6 corresponding to the tire vulcanization mold M, in the second embodiment a horizontal rail 6d is fixed on the lower surface of the beam 6b of the elevating frame 6 in the transverse direction, and direct-acting bearings 8c engaging with the horizontal rail 6d are fixed to the top surface of the spacer 8. To the lower flange 8a of the spacer 8 is attached the upper half mold Ma of the tire vulcanization mold M. By moving the spacer 8 in the transverse direction as indicated by the arrow in FIG. 4 by actuating a drive means (not shown), the connection severing device 8b can be used in common for a plurality of sets of tire vulcanization molds M.

In the tire vulcanizer shown in FIG. 4, after the connection severing device 8b is made in the severing state in advance, the elevating frame 6 is raised slightly once, and then the connection severing device 8b is moved, via the spacer 8, to the position of tire vulcanization mold M in which the vulcanization process is finished next, and then the elevating frame 6 is lowered. The elevating frame 6 is connected to the upper half mold Ma of the tire vulcanization mold M, and the finish of the tire vulcanization process in this tire vulcanization mold M is waited. The subsequent operation is the same as that of the first embodiment.

Needless to say, in the second embodiment, a plurality of conventional tire vulcanization molds cannot be mounted.

What is claimed is:

1. A tire vulcanizer comprising (a) a fixed base on which at least one tire vulcanization mold is mounted having an upper and bottom half respectively, with the mold arranged with a plurality of other molds in a row on said fixed base (b) a movable frame which can reciprocate on said base in a longitudinal direction approaching and moving away from the mold, (c) a rail mounted on said fixed base to which said movable frame is attached to permit said frame to move longitudinally in a direction transverse to the row of molds on said fixed base, (d) an elevating frame attached to said movable frame so as to be raised and lowered, (e) a horizontal rail attached to said elevating frame oriented in a direction transverse to the direction in which said elevating frame is raised and lowered and in parallel to said row of molds with said horizontal rail having horizontal tracks, (f) a transfer member slidably affixed to the horizontal tracks of said horizontal rail, and (g) a green tire loader connected to said transfer member for providing controlled horizontal movement of said green tire loader along said horizontal tracks to permit unloading of a vulcanized tire and loading of a green tire from the mold by the process of (i) raising said elevating frame and opening the mold, (ii) lifting the upper half of the mold and moving one half of the mold relative to the other by means of said movable frame such that the upper half is moved away from the bottom half and (iii) moving said transfer member until the center of the green tire loader becomes concentric with the center of said bottom half of the mold thereby permitting removal of a vulcanized tire and reloading of a green tire in sequence.

2. A tire vulcanizer according to claim 1, wherein a plurality of molds are mounted on the fixed base, and a connection severing device for severing the connection between said upper half and bottom half is attached to said elevating frame so as to correspond to each mold.

3. A tire vulcanizer according to claim 2, wherein said connection severing device is supported by said horizontal rail so as to be movable in a direction transverse to the direction in which said elevating frame can be raised and lowered.

\* \* \* \* \*